United States Patent
Sharifi et al.

(10) Patent No.: US 12,411,919 B2
(45) Date of Patent: Sep. 9, 2025

(54) SHARED ASSISTANT PROFILES VERIFIED VIA SPEAKER IDENTIFICATION

(71) Applicant: Google LLC, Mountain View, CA (US)

(72) Inventors: Matthew Sharifi, Kilchberg (CH); Victor Carbune, Zürich (CH)

(73) Assignee: Google LLC, Mountain View, CA (US)

( * ) Notice: Subject to any disclaimer, the term of this patent is extended or adjusted under 35 U.S.C. 154(b) by 488 days.

(21) Appl. No.: 17/648,095

(22) Filed: Jan. 14, 2022

(65) Prior Publication Data

US 2023/0153410 A1    May 18, 2023

Related U.S. Application Data

(60) Provisional application No. 63/264,167, filed on Nov. 16, 2021.

(51) Int. Cl.
    *G06F 21/32*      (2013.01)
    *G06F 3/0481*      (2022.01)
    (Continued)

(52) U.S. Cl.
    CPC .......... *G06F 21/32* (2013.01); *G06F 21/6245* (2013.01); *G10L 17/02* (2013.01);
    (Continued)

(58) Field of Classification Search
    CPC ..... G06F 21/32; G06F 21/6245; G10L 17/02; G10L 17/14; G10L 17/24
    See application file for complete search history.

(56) References Cited

U.S. PATENT DOCUMENTS

2003/0229492 A1* 12/2003 Nolan .................. G10L 17/06
                                                       704/E17.007
2007/0101419 A1* 5/2007 Dawson ................ G06F 21/32
                                                        726/9

(Continued)

FOREIGN PATENT DOCUMENTS

EP           3664082 A1    6/2020
JP           2002073198 A *   3/2002

OTHER PUBLICATIONS

Jul. 29, 2022 Written Opinion (WO) of the International Searching Authority (ISA) and International Search Report (ISR) issued in International Application No. PCT/US2022/012575.

(Continued)

*Primary Examiner* — Alexander Lagor
*Assistant Examiner* — Brandon Binczak
(74) *Attorney, Agent, or Firm* — Honigman LLP; Brett A. Krueger; Grant Griffith

(57) ABSTRACT

A method for sharing assistant profiles includes receiving, at a profile service, from an assistant service interacting with a user device of a user, a request requesting the profile service to release personal information associated with the user to the assistant service. The operations also include performing, through the assistant service, a verification process to verify that the user consents to releasing the requested personal information by: instructing the assistant service to prompt the user to recite a unique token prescribed to the user; receiving audio data characterizing a spoken utterance captured by the user device of the user; processing the audio data to determine whether a transcription of the spoken utterance recites the unique token; and when the transcription of the spoken utterance recites the unique token, releasing, to the assistant service, the requested personal informa- (Continued)

tion stored on a centralized data store managed by the profile service.

24 Claims, 8 Drawing Sheets

(51) Int. Cl.
  *G06F 21/62* (2013.01)
  *G10L 17/02* (2013.01)
  *G10L 17/14* (2013.01)
  *G10L 17/24* (2013.01)
(52) U.S. Cl.
  CPC .............. *G10L 17/14* (2013.01); *G10L 17/24* (2013.01); *G06F 3/0481* (2013.01)

(56) References Cited

U.S. PATENT DOCUMENTS

| | | | | |
|---|---|---|---|---|
| 2007/0286354 A1* | 12/2007 | Shaffer | ................. | H04M 3/385 379/67.1 |
| 2014/0157384 A1* | 6/2014 | Stern | ................... | H04L 63/0861 726/7 |
| 2014/0223581 A1* | 8/2014 | Mahendrakar | .......... | G06F 21/31 726/28 |
| 2019/0124049 A1* | 4/2019 | Bradley | ................. | H04W 76/14 |
| 2019/0392162 A1* | 12/2019 | Stern | ................... | G06F 21/6245 |
| 2020/0067906 A1* | 2/2020 | Florez | ................. | H04L 63/0815 |
| 2020/0380980 A1* | 12/2020 | Shum | ...................... | G10L 15/18 |
| 2021/0256102 A1* | 8/2021 | Luft | ...................... | H04L 63/045 |
| 2021/0334402 A1* | 10/2021 | Detchemendy | ....... | H04L 63/108 |
| 2022/0255945 A1* | 8/2022 | Guan | ................... | H04L 63/102 |
| 2022/0405360 A1* | 12/2022 | Edwards | ................. | G10L 17/24 |
| 2023/0319533 A1* | 10/2023 | Ly | .......................... | H04L 43/04 709/224 |

OTHER PUBLICATIONS

Kounoudes Anastasis et al: "Intelligent Speaker Verification based Biometric System for Electronic Commerce Applications", Proceedings of World Academy of Science, Engineering and Technology, Aug. 14, 2006 (Aug. 14, 2006), pp. 290-294.

Zhang Nan et al: "Dangerous Skills: Understanding and Mitigating Security Risks of Voice-Controlled Third-Party Functions on Virtual Personal Assistant Systems", 2019 IEEE Symposium on Security and Privacy (SP), IEEE, May 19, 2019 (May 19, 2019), pp. 1381-1396.

* cited by examiner

Personal Information 200

Address
Phone Number(s)
Payment Information
Date of Birth
Social Security Number
Gender
Contact Information
Marital Status
Occupation User Preferences
Scheduling Preferences
Shipping Preferences
Communication Preferences
Music/Movie Genre(s)
Dietary Preferences/Restrictions
Purchase History
Password(s)

FIG. 2

SHARED ASSISTANT PROFILES VERIFIED VIA SPEAKER IDENTIFICATION

CROSS-INFERENCE TO RELATED APPLICATIONS

This U.S. patent application claims priority under 35 U.S.C. § 119(e) to U.S. Provisional Application 63/264,167, filed on Nov. 16, 2021. The disclosure of this prior application is considered pan of the disclosure of this application and is hereby incorporated by reference in its entirety.

TECHNICAL FIELD

This disclosure relates to shared assistant profiles verified via speaker identification.

BACKGROUND

Users frequently interact, with voice-enabled assistant interfaces on smart devices such as: without limitation, phones, watches, and smart speakers/displays. These assistant interfaces enable users to get things done and find answers to questions they might have, all through natural, conversational interactions. Developers are increasingly developing voice-enabled assistant interfaces for applications and services to permit user interaction through natural conversation. For example, automatic speech recognition (ASR) and natural language understanding (NLU) models may recognize and interpret queries spoken by users and fetch responses to these spoken queries. As users begin to interact with many different assistant services, it can become an annoyance to require users to input common details pertaining to user information repeatedly across the different assistant services yet still keep the user information private/secure.

SUMMARY

One aspect of the disclosure provides a computer-implemented that when executed on data processing hardware causes the data processing hardware to perform operations that include receiving, at a profile service executing on the data processing hardware, from an assistant service interacting with a user device of a user, a request requesting the profile service to release personal information associated with the user to the assistant service. The operations also include performing, through the assistant service, a verification process to verify that the user consents to releasing the requested personal information to the assistant service by instructing the assistant service to prompt the user to recite a unique token prescribed to the user, receiving audio data characterizing a spoken utterance captured by the user device of the user; processing the audio data to determine whether a transcription of the spoken utterance recites the unique token; and when the transcription of the spoken utterance recites the unique token, releasing, to the assistant service, the requested personal information stored on a centralized data store managed by the profile service.

Implementations of the disclosure may include one or more of the following optional features. In some implementations, the operations also include, while performing the verification process through die assistant service, processing the audio data to determine whether the spoken utterance captured by the user device was spoken by the user associated with the requested personal information. Here, releasing the requested personal information to the assistant service further includes releasing the requested personal information to the assistant service when the transcription of the spoken utterance recites the unique token and the utterance was spoken by the user.

The personal information requested by the assistant service may pertain to personal information required by the assistant service in order to fulfill a query submitted by the user to the assistant service via the user device. In some examples, after releasing the requested personal information to the assistant service, the assistant service is configured to use the personal information to fulfill a query submitted by the user. Additionally or alternatively, tire assistant service may execute locally on the user device or on a server remote from the user device.

In some implementations, the operations also include, in response to receiving the request for the personal information associated with the user, determining whether the requested personal information is stored in the centralized data store and determining, whether a set of user permissions associated with the user restrict the assistant service from accessing the requested personal information. In these implementations, when at least one of the requested personal information is not stored in the centralized data store or the set of user permissions associated with the user restrict the assistant service from accessing the requested personal information, the operations also include bypassing performance of the verification process and informing the assistant service that the user is required to provide the requested personal information in full to the assistant service. In these implementations, the operations may also include, after informing the assistant service that the user is required to provide the requested personal information in full: receiving, from the assistant service, a profile storage request requesting the profile service to store the requested personal information provided by the user to the assistant service; and storing the requested personal information provided by the user in the centralized data store. Here, the profile storage request includes the requested personal information provided in full by the user.

Additionally or alternatively, in these implementations, the operations may also include, when the requested personal information is stored in the centralized data store and the set of user permissions associated with the user do not restrict the assistant service from accessing the requested personal information, determining whether the user device is suitable for receiving out-of-band notifications. Here, when the user device is suitable for receiving out-of-band notifications the operations also include: transmitting an out-of-band notification from the profile service to the user device, the out-of-band notification when received by the user device causing the user device to prompt the user to provide consent to release the requested personal information to the assistant service; receiving, from the user device, a consent response indicating that the user consents to releasing the requested personal information to the assistant service; and responsive to receiving the consent response, releasing, to the assistant service, the requested personal information stored on the centralized data store. The user device may be suitable for receiving out-of-band notifications when the user device includes a display screen and the user device may prompt the user to provide consent to release the requested personal information by displaying a selectable graphical element on the display screen, that when selected by the user causes the user device to transmit the consent response to the profile service. Moreover, determining whether the user device is suitable for receiving out-of-band notifications may be based on application settings associated with the assistant service indicating whether the profile service is restricted from communicating out-of-band notifications to the user device for gaining user consent for releasing the personal information. Optionally, the profile service may perform the verification process through the assistant service when the user device is not suitable for receiving out-of-band notifications.

In some examples performing the verification process through the assistant service further includes generating an arbitrary phrase of one or more terms, wherein the generated arbitrary phrase includes the unique token. In these examples, instructing the assistant service to prompt the user to recite the unique token causes the assistant service to output a verification message from the user device that prompts the user to speak each term of the one or more terms of the arbitrary phrase to provide consent for releasing the personal information. In these examples, the verification message output from the user device may further indicate a type of the personal information the assistant service is requesting the profile service to release.

In some implementations performing the verification process through the assistant service further includes, extracting, from the requested personal information stored in the centralized data store, one or more personal information fragments, wherein the unique token includes the one or more fragments; and generating a security statement answered by the one or more personal information fragments of the unique token. In these implementations, instructing the assistant service to prompt the user to recite the unique token causes the assistant service to output the security statement from the user device for the user to answer via spoken input to provide consent for releasing the personal information, and processing the audio data to determine whether the transcription of the spoken utterance recites the unique token includes determining whether the transcription of the utterance recites the one or more fragments extracted from the requested personal information.

The personal information may include demographic information associated with the user that includes at least one of an address, a phone number, payment information, a date of birth, a social security number, gender, contact information, marital status, or occupation. Additionally or alternatively, the personal information may include one or more user preferences that includes at least one of scheduling preferences, communication preferences, shipping preferences, music/movie genre(s), dietary preferences/restrictions, purchase history, contacts, or password(s).

Another aspect of the disclosure provides a system that includes data processing hardware and memory hardware in communication with the data processing hardware. The memory hardware stores instructions that when executed on the data processing hardware causes the date processing hardware to perform operations that include receiving, at a profile service executing on the data processing hardware, from an assistant service interacting with a user device of a user, a request requesting the profile service to release personal information associated with the user to the assistant service. The operations also include performing, through the assistant service, a verification process to verify that the user consents to releasing the requested personal information to the assistant service by instructing the assistant service to prompt the user to recite a unique token prescribed to the user; receiving audio data characterizing a spoken utterance captured by the user device of the user, processing the audio data to determine whether a transcription of the spoken utterance recites die unique token, and when the transcription of the spoken utterance recites the unique token, releasing, to the assistant service, the requested personal information stored on a centralized data store managed by the profile service.

This aspect may include one or more of the following optional features. In some implementations, the operations also include, while performing the verification process through the assistant service, processing the audio data to determine whether the spoken utterance captured by the user device was spoken by die user associated with the requested personal information. Here, releasing the requested personal information to the assistant service further includes releasing the requested personal information to the assistant, service when the transcription of the spoken utterance recites the unique token and the utterance was spoken by the user.

The personal information requested by the assistant service may pertain to personal information required by the assistant service in order to fulfill a query submitted by the user to the assistant service via the user device. In some examples, after releasing the requested personal information to the assistant service, the assistant service is configured to use the personal information to fulfill a query submitted by the user. Additionally or alternatively, the assistant service may execute locally on the user device or on a server remote from the user device.

In some implementations, the operations also include, in response to receiving the request for the personal information associated with the user, determining whether the requested personal information is stored in the centralized data store and determining whether a set of user permissions associated with the user restrict the assistant service from accessing the requested personal information. In these implementations, when at least one of the requested personal information is not stored in the centralized data store or the set of user permissions associated with the user restrict the assistant service from accessing the requested personal information, the operations also include bypassing performance of the verification process and informing the assistant service that the user is required to provide the requested personal information in full to the assistant service. In these implementations, the operations may also include, after informing the assistant service that the user is required to provide the requested personal information in full; receiving, from the assistant service, a profile storage request requesting the profile service to store the requested personal information provided by the user to the assistant service, and storing the requested personal information provided by the user in the centralized data store. Here, the profile storage request includes the requested personal information provided in full by the user.

Additionally or alternatively, in these implementations, the operations may also include, when the requested personal information is stored in the centralized data store and the set of user permissions associated with the user do not restrict the assistant service from accessing the requested personal information, determining whether the user device is suitable for receiving out-of-band notifications. Here, when the user device is suitable for receiving out-of-band notifications the operations also include transmitting an out-of-band notification from the profile service to the user device, the out-of-band notification when received by the user device causing the user device to prompt the user to provide consent to release the requested personal information to the assistant service; receiving, from the user device, a consent response indicating that the user consents to releasing the requested personal information to the assistant service, and responsive to receiving the consent response, releasing, to the assistant service, the requested personal information stored on the centralized data store. The user device may be suitable for receiving out-of-band notifications when the user device includes a display screen and the user device may prompt the user to provide consent to release the requested personal information by displaying a selectable graphical element on the display screen, that when selected by the user causes the user device to transmit the consent response to the profile service. Moreover, determining whether the user device is suitable for receiving out-of-band notifications may be based on application settings associated with the assistant service indicating whether the profile service is restricted from communicating out-of-band notifications to the user-device for gaining user consent for releasing the personal information. Optionally, the profile service may perform the verification process through the assistant service when the user device is not suitable for receiving out-of-band notifications.

In some examples, performing the verification process through the assistant service further includes generating an arbitrary phrase of one or more terms, wherein the generated arbitrary phrase includes the unique token. In these examples, instructing the assistant service to prompt the user to recite the unique token causes the assistant service to output a verification message from the user device that prompts the user to speak each term of the one or more terms of the arbitrary phrase to provide consent for releasing the personal information. In these examples, the verification message output from the user device may further indicate a type of the personal information the assistant service is requesting the profile service to release.

In some implementations, performing the verification process through the assistant, service further includes, extracting, from the requested personal information stored in the centralized data store, one or more personal information fragments, wherein the unique token includes the one or more fragments; and generating a security statement answered by the one or more personal information fragments of the unique token. In these implementations, instructing the assistant service to prompt the user to recite the unique token causes the assistant service to output the security statement from the user device for the user to answer via spoken input to provide consent for releasing the personal information, and processing the audio data to determine whether the transcription of the spoken utterance recites the unique token includes determining whether the transcription of the utterance recites the one or more fragments extracted from the requested personal information.

The personal information may include demographic information associated with the user that includes at least one of an address, a phone number, payment information, a date of birth, a social security number, gender, contact information, marital status, or occupation. Additionally or alternatively, the personal information may include one or more user preferences that includes at least one of scheduling preferences, communication preferences, shipping preferences, music/movie genre(s), dietary preferences/restrictions, purchase history, contacts, or password(s).

The details of one or more implementations of the disclosure are set forth in the accompanying drawings and the description below. Other aspects, features, and advantages will be apparent from the description and drawings, and from the claims

DESCRIPTION OF DRAWINGS

FIG. 2 is a schematic view of example personal information 200 for a user profile stored in a centralized data store.

FIG. 2 is a schematic view of example components of an assistant service.

Like reference symbols in the various drawings indicate like elements.

DETAILED DESCRIPTION

Figure 1A:
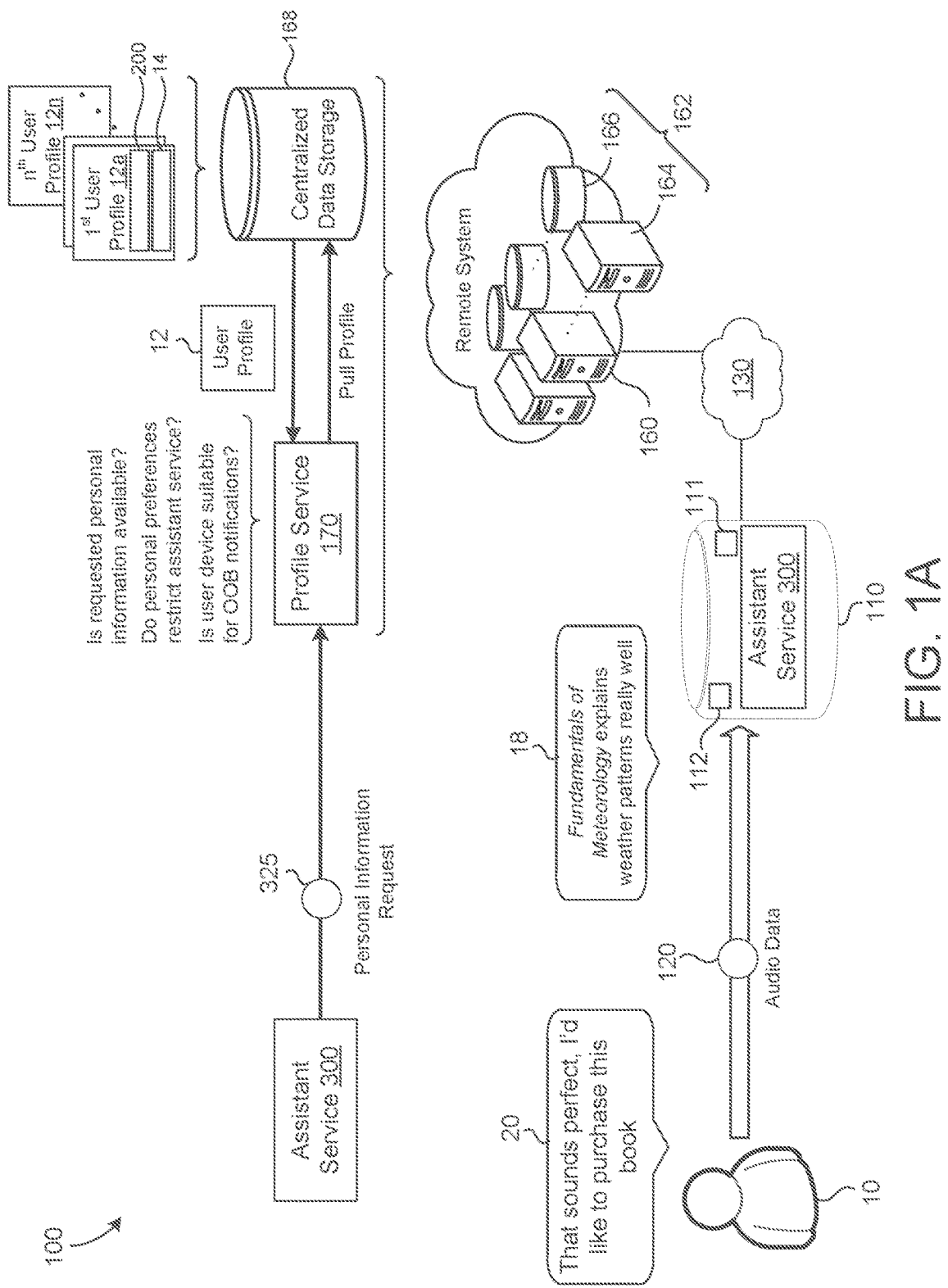
FIGS. 1A-1C are schematic views of an example speech environment for sharing personal information across assistant services.

Users frequently interact with voice-enabled assistant interfaces on smart devices such as, without limitation, phones, watches, and smart speakers/displays. These assistant interfaces enable users to get things done and find answers to questions they might have, all through natural, conversational interactions. Developers are increasingly developing voice-enabled assistant interfaces for applications and services to permit user interaction through natural conversation. For example, automatic speech recognition (ASR) and natural language understanding (NLU) models may recognize and interpret queries spoken by users and fetch responses to these spoken queries.

As users begin to interact with many different assistant services, it can become an annoyance to require users to input common details of personal information repeatedly across the different assistant services yet still keep the personal information private/secure. As used herein, personal information can include demographic information such as phone numbers), home/work address(es), date of birth, payment details, and the like. Personal information may also include user-specific preferences that pertain to the user and permit assistants to interact with a user in a more tailored and personalized manner. For instance, user-specific preferences may include attributes that convey details about the user such as the user does not like to schedule appointments on a particular day of the week (e.g., Monday), dietary restrictions/preferences (e.g., the user is vegetarian and allergic to dairy), recent purchase history (e.g., the user recently purchased running shoes). The user-specific preferences can be input explicitly by the user and/or learned over time based on past, interactions with one or more assistant services.

Personal information pertaining to a particular user may be stored in a central location such as a centralized data store hosted by a cloud service provider and managed by a profile service of the cloud service provider. In these instances, the cloud service provider may host many applications/services used by the user and the user may explicitly grant permission to store the personal information at the centralized data store as part of a user profile pertaining to the user. The profile service may manage storage and access to user profiles for a population of users that correspond to customers of the cloud service provider. These users/clients may explicitly grant permission to the profile service for storing their personal information and profiles in the centralized data store. Additionally, these users/clients may also define application permissions indicating which services/applications are allowed to access the stored personal information and/or which services/applications are restricted from accessing the stored personal information. As such, the profile service may grant, with the consent of the user, these applications/services access to the personal information stored in the centralized data store when needed without having to burden the user by requiring these applications/services to request the user to input the same personal information repeatedly. The profile service always provides the user the option to delete any of the personal information at the centralized data store and allow the user to revoke permission previously granted by the user to store the personal information at the central data store at any time.

Implementations herein are directed toward techniques tor supporting the sharing of personal information pertaining to a particular user across multiple assistant services in a private and secure manner to thereby eliminate any requirement by the user to re-enter (e.g., via text or speech) common attributes from the personal information when requested by the different assistant services. Specifically, the user may store the personal information in a centralized data store and explicitly grant consent to a profile service (e.g., hosted by a cloud service provider) to permit the assistant services to access the personal information stored in the centralized data store. Notably, an assistant service requesting retrieval of personal information from the centralized data store for a particular user may trigger a verification step that the user must perform in order to grant consent to the assistant service for the stored personal information in the centralized datastore.

As will become apparent, this verification step may leverage speech recognition and speaker identification techniques to verify utterances spoken by the user of unique tokens and/or fragments from the personal information requested by the assistant service. For example, when the assistant service is requesting the profile service for access to a street address of a user's residence stored in the centralized data store, the profile service may extract the user's house number (e.g., 5-1-0-5) and city (e.g., Atlantic City) front the user's street address as fragments and generate a security statement (e.g., "What is your house number and what city do you live in") answered by the fragments. To permit the user to provide consent tor releasing the requested personal information, the profile service may instruct the assistant service to output the security statement from the user device for the user to answer via a spoken utterance. The security statement may be in the form of a question or as a command (e.g., "Please provide your house number and the city you live in"). Thereafter, the profile service processes audio data of the spoken utterance captured by the user device to provide two-factor authentication where a transcription of the utterance must recite the correct house number (e.g., 5-1-0-5) and city name (e.g., Atlantic City) and a speaker-discriminative vector extracted from the audio data must match a reference speaker-discriminative vector associated with the user. As such, the profile service may perform speech recognition on the audio data to generate a transcription of the utterance to ascertain the house number and city name spoken by the user and determine whether it matches the corresponding house number and city name stored in the data store for the user. At the same time, the profile service may execute a speaker verification process by performing text-independent speaker identification (TI-SID) on the audio data to extract the speaker-discriminative vector and determine whether it matches the reference speaker-discriminative vector stored in the user profile for the user in the centralized data store. In addition to or in lieu of prompting the user to speak a fragment of the requested information, the profile service may generate a unique token (e.g., "Bumblebee") and prompt the user to speak the unique token. In this scenario, the profile service may execute the speaker verification process by performing TI-SID on audio data characterizing the user uttering "Bumblebee" to extract the speaker-discriminative vector and determine whether it matches the reference speaker-discriminative vector for the user. Additionally or alternatively, the unique token may be a password known to the user and in which a text-dependent reference speaker-discriminative vector exists for the user where the user spoke the password during an enrollment process.

Figure 1B:
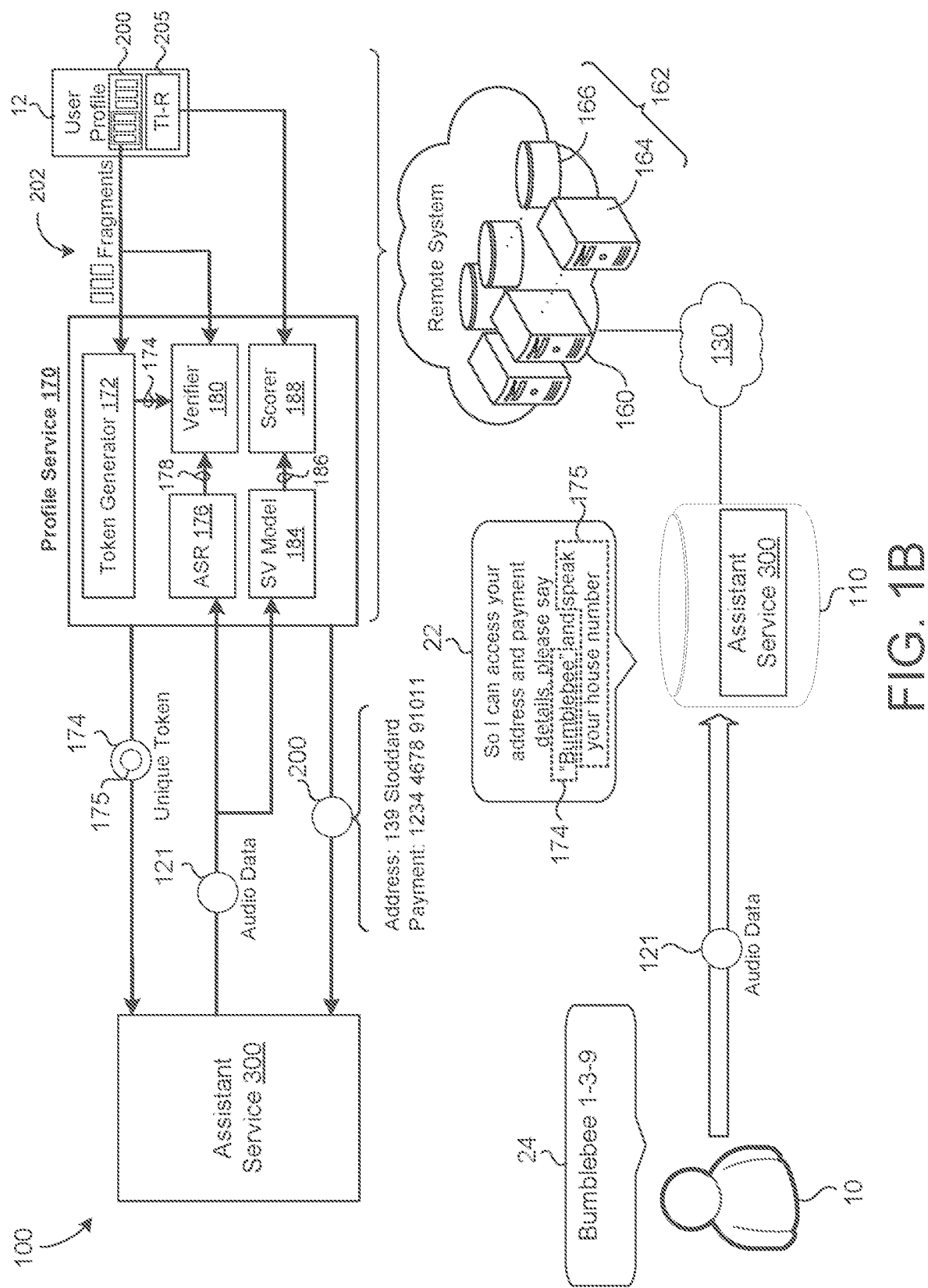
Figure 1C:
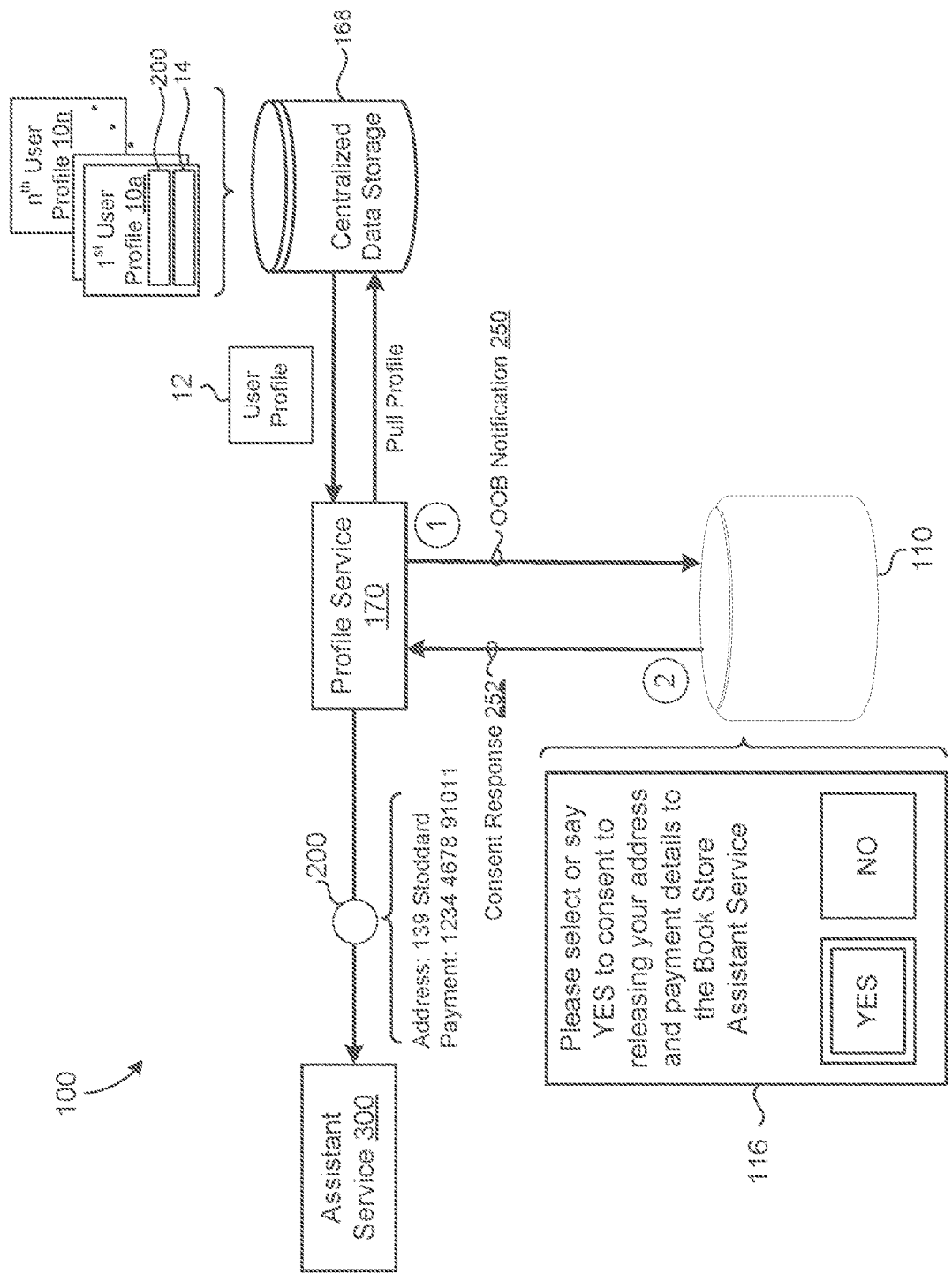

FIGS. 1A-1C show a speech environment 100 including a user 10 interacting with an assistant service 300 running on an assistant-enabled device (also referred to as user device 110, device 110, or an AED 110). In the example shown, the assistant service 300 corresponds to a custom assistant service created by a developer to allow users to discover and discuss books, while also supporting a flow for purchasing a book. Notably, the user 10 may interact with other custom assistant services via the user device 110 and/or other devices, where these other custom assistants are also developed by developers for performing tasks in other domains of interest to the user 10.

FIG. 1A shows the assistant service 300 outputting synthesized speech 18 from the user device 110 as part of a dialogue where the assistant service 300 states *"Fundamentals of Meteorology* explains weather patterns really well". In response, the user 10 speaks a query 20 directed toward the assistant service 300 that is captured by the user device 110 in streaming audio indicating that the user 10 would like to purchase the book *Fundamentals of Meteorology*. Thus, the query 20 refers to a request to perform an action, operation, or task, and more specifically, a request for the assistant service 300 to perform an action, operation, or task related to purchasing the book for the user 10.

In order to fulfill the query 20 (purchase and ship the book) spoken by the user 10, the assistant service 300 needs personal information 200 pertaining to the user's 10 payment details (e.g., credit card information) and home address. Notably, the user 10 may interact with a multitude of other custom assistant services through the user device 102 or other devices, and on one or more previous occasions, some of these other assistant services may have required these same attributes of personal information (e.g., payment details and home address). For instance, the user 10 may also use a custom assistant service for booking trips where the user 10 provided payment details for reserving a hotel and purchasing a plane ticket and also provided his/her home address as a pick-up point tor a cab for taking the user 10 to the airport. In this scenario, the payment details and home address provided by die user 10 while interacting with the trip booking assistant service may be stored (with the user's 10 consent) in centralized data storage (also referred to as centralized data store) that a profile service 170 manages for a population of users. As will become apparent, the assistant service 300 for discovering, discussing, and purchasing books may provide a personal information request 325 to the profile service 170 requesting release of the payment details and home address stored as personal information 200 in the centralized data storage 168. The profile service 170 may verify the identity of the user and verify that the user 10 consents to releasing the personal information 200 to the assistant service 300 and then release the requested personal information 200 to the assistants service 300 to fulfill the query 20 without requiring the user 10 to input the personal information in full.

Some examples of user devices 110 include, but are not limited to, mobile devices (e.g., mobile phones, tablets, laptops, e-book readers, etc.), computers, wearable devices (e.g., smart watches), music players, casting devices, smart appliances (e.g., smart televisions), vehicle infotainment devices, internet of things (IoT) devices, remote controls, smart speakers, etc. The user device 110 includes data processing hardware 111 and memory hardware 112 storing instructions that when executed on the data processing hardware 111 cause the data processing hardware 111 to perform operations. The user device 110 includes an array of one or more microphones configured to capture acoustic sounds such as speech directed toward the user device 110. The user device 110 may also include, or be in communication with, an audio output device (e.g., speaker) configured to output audio such as synthesized speech 18, 22 from the assistant service 300 and other assistant services the user 10 interacts with from time to time. As used herein, each assistant service 300 may also be referred to as a digital assistant or digital assistant interface.

In the example of FIG. 1A, the user device 102 does not include a display, however, in other examples, FIG. 1C shows the user device 102 having a display 116 configured to display graphical user interface (GUI) elements (e.g., windows, screens, icons, menus, etc.) anchor graphical content. For example, the device 110 may load or launch applications that generate GUI elements or other graphical content for the display 116. Moreover, the elements generated in the display 116 may be selectable by the user 10 and also serve to provide some form of visual feedback to processing activities and/or operations occurring on the device 110. Furthermore, since the device 110 is a voice-enabled device 110, the user 10 may interact with elements generated on the display 116 using various voice commands.

In some implementations, the device 110 communicates via a network 130 with a remote system 160 (also referred to as a remote server 160). The remote system may include remote resources 162, such as remote data processing hardware 164 (e.g., remote servers or CPUs) and/or remote memory hardware 166 (e.g., remote databases or other storage hardware). The device 110 may utilize the remote resources 162 to perform various functionality related to conversational assistant services 300 the user 10 interacts with. For instance, some portion of the assistant service 300 may reside on the remote system 160 where a developer built the assistant service 300 as a custom, voice-based digital assistant using a set of cloud application programming interfaces (APIs) hosted by the remote system 160. As such, the remote system 160 may correspond to a cloud service provider hosting a multitude of custom assistant services 300. In one example, assistant service 300 executes locally on the device 110. In another example, the assistant service 300 resides on the remote system 160 and communicates with the user device 110 over the network 130. In yet another example, functionality of the assistant service 300 is split across the device 110 and the remote system 160 (e.g., the device 110 and the remote system 160 processes aspects of the assistant service 300 in parallel).

The profile service 170 executes on the data processing hardware 164 of the remote system 160 and is configured to manage access to user profiles 12, 12a-n stored in the centralized data storage 168 overlain on the memory hardware 166. Each user profile 12 is associated with a respective user who may interact with one or more assistant services hosted by the remote system 160, other remote systems, locally on one or more user devices, or some combination thereof. Each user profile 12 includes, without limitation, personal information 200 associated with the respective user and may also include a set of user permissions 14. FIG. 2 shows an example of personal information 200 in a respective user profile. For instance, the personal information 200 may include demographic information such as, without limitation, one or more addresses (e.g., home and/or work addresses), one or more phone numbers, payment information, date of birth, social security number, gender, contact information, marital status, and an occupation of the respective user. The personal information 200 may also include user preferences such as, without limitation, scheduling preferences (e.g., the respective user does not like to schedule appointments in the mornings or on Mondays), communication preferences (prefers to receive text messages), shipping preferences, music/movie genre(s) the respective user likes, dietary preferences/restrictions, purchase history, or passwords. Some of the user preferences may be explicitly input by the user, while other user preferences may be learned and updated based on interactions with assistant services and/or other services hosted by the remote system 160.

In response to receiving the request 325 from the assistant service 300 for the personal information 200, FIG. 1A shows the profile service 170 determining whether the requested personal information 200 is stored in the centralized data store 168 and whether the set of user permissions 14 associated with the user 10 restrict the assistant service 300 from accessing the requested personal information 200. Here, the personal information request 325 may identify the type of personal information the assistant service 300 needs as well as a user identifier identifying the user 10 so that the profile service 170 pulls the respective user profile 12 associated with the user 10 from the data storage 168 to inspect the personal information 200 and the user permissions 14. The personal information request 325 may also include a device identifier that uniquely identifies the user device 102 the user 10 is using to interact with the assistant service 300. The device identifier may indicate, or be used to obtain, a type of the user device (e.g., phone, speaker, make/model, etc.), peripherals of the user device (e.g., display or no display?), an operating system running on the user device 110, or other characteristics associated with the user device 110.

Figure 4:
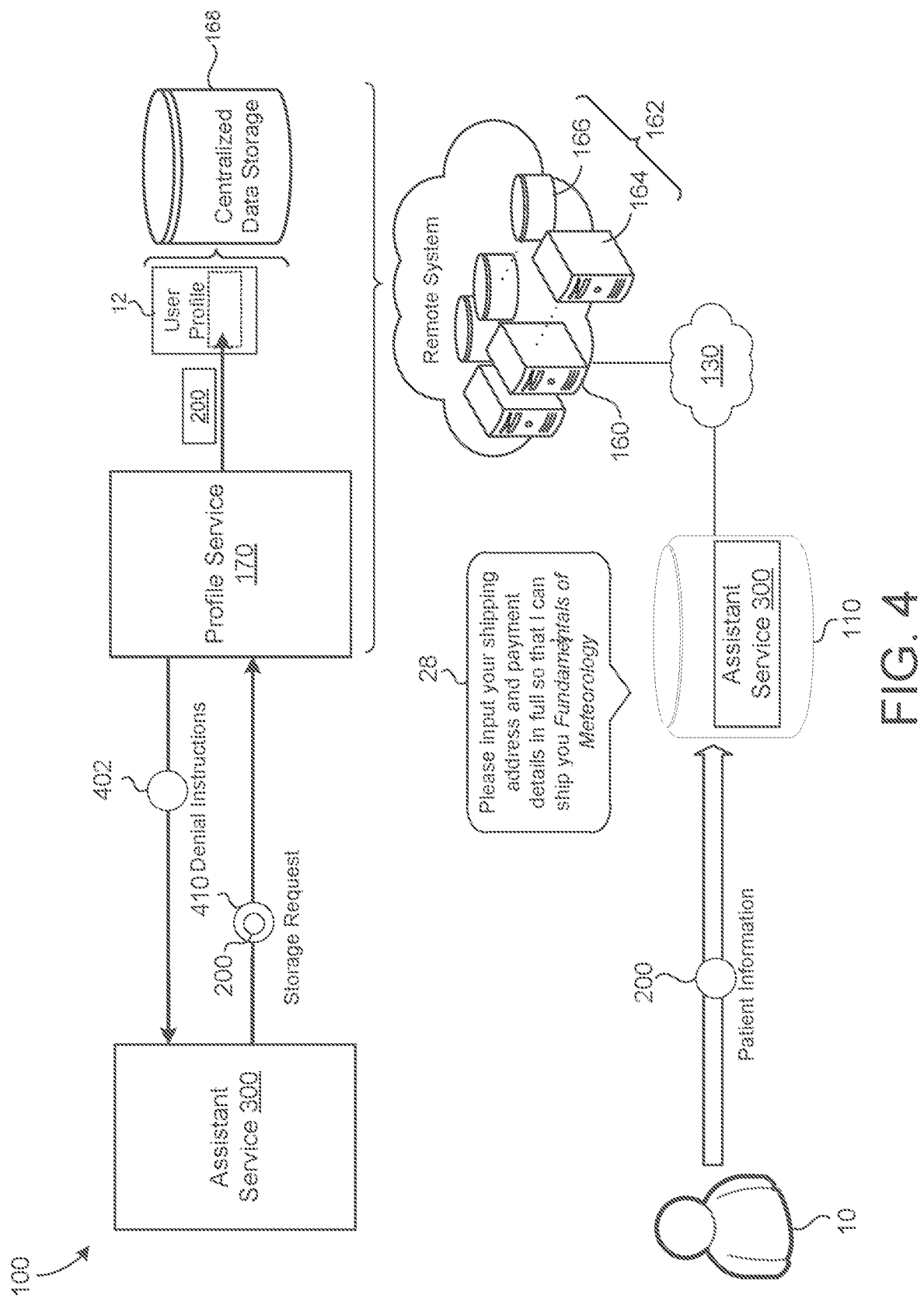
FIG. 4 is a schematic view of an example speech environment where a user is required to input personal information in full.

When at least one of the requested personal information 200 is not stored in the centralized data store 168 or the set of user permissions 14 associated with the user 10 restrict the assistant service 300 from accessing the requested personal information, the profile service 170 bypasses performance of a verification process depicted in FIGS. 1A-1C for verifying that the user 10 consents to releasing the personal information 200 to the assistant service 300 and instead informs the assistant service 300 that the user 10 is required to provide the requested personal information 200 in full to the assistant service. For instance, FIG. 4 shows the profile service 170 responding to the assistant service 300 with denial instructions 402 that cause the assistant service 300 to prompt the user 10 to input the personal information 200 (e.g., payment information and address) needed by the assistant service 300 in order to fulfill the query 20 to purchase and ship the book to the user 10. In some examples, the assistant service 300 prompts the user 10 by outputting synthesized speech 28 from the user device that requests the user to "Please input your shipping address and payment details in full so that I can ship you *Fundamentals of Meteorology*". Subsequently, the user 10 inputs the personal information 200 (e.g., by spoken input or textual input) to the user device 110 for use by the assistant service 300 to fulfill the query 20. In some examples, the assistant service 300 submits a storage request 410 to the profile service 170 that includes the personal information 200 input by the user 10 and requests the profile service 170 to store the personal information 200 (e.g., payment details and address) in a user profile 12 for the user 10 stored in the centralized data storage 168. Notably, provided the user permissions 14 allow, these attributes of the personal information 200 stored in the centralized data storage 108 may be released to the assistant service 300 or other assistant services as needed so long as the user consents to the release of the personal information 200.

When the requested personal information 200 is stored in the centralized data store 168 and the set of user permissions 14 associated with the user 10 do not restrict the assistant service 300 from accessing the requested personal information, FIG. 1B shows the profile service 170 performing the verification process through the assistant service 300. Optionally, the profile service 170 may determine whether the user device 110 is suitable for receiving out-of-band (OOB) notifications directly from the profile service 170 and only perform the verification process through the assistant service 300 when the user device 110 is not suitable for receiving OOB notifications. In some examples, the user device is not suitable for receiving OOB notifications when the user device does not include a display screen and/or application settings associated with the assistant service 300 indicate that the assistant service 300 is restricted from communicating OOB notifications to the user device 110 for gaining user consent for releasing the personal information. An operating system the user device 110 runs may be ascertained from the device identifier contained in the personal information request 325 and be applied as an attribute for determining whether or not the user device 110 is suitable for receiving OOB notifications.

When the profile service 170 determines the user device 110 is suitable for receiving OOB notifications (i.e., the user device 110 includes a display 116 and the application settings to not restrict OOB notifications), FIG. 1C depicts the profile service 170 performing the verification process without the assistant service 300 by transmitting an OOB notification 250 to the user device 110 that causes the user device 110 to prompt the user 10 to provide consent to release the requested personal information to the assistant service 300. Notably, the OOB notification 250 is communicated directly from the profile service 170 to the user device 110 via the network 130 without the need of the assistant service 300. The user device 110 may display the prompt in a GUI presented on the display 116 and/or present the prompt via synthesized speech. In the example shown, the prompt is displayed as a textual message on the display 116 and provides selectable graphical elements that permit the user 10 to provide a user input indication indicating selection of the "Yes" graphical element to provide consent for releasing the personal information 200. Similarly, the user device 110 may receive a user input indication indicating selection of the "No" graphical element to deny consent for releasing the personal information. A timeout resulting in a denied consent may occur when the user 10 does not provide any selection within a predetermined period of time. When the user 10 provides the input indication indicating selection of the "Yes" graphical element displayed on the display 116, the user device 110 transmits a consent response 252 to the profile service 170 indicating that the user 10 consents to releasing the requested personal information 200 to the assistant service 300. Accordingly, the profile service 170 may release the requested personal information 200 stored on the centralized data store to the assistant service 300 in response to receiving the consent response 252. Selection of the "No" graphical element or no selection before the timeout may result in the user device 110 transmitting a consent denial response indicating that the user does not consent to releasing the personal information 200 to the assistant service 300.

Referring back to FIG. 1B, the profile service 170 performs the verification process through the assistant service 300 to verify that the user 10 consents to releasing the requested personal information 200 to the assistant service 300. Here, the profile service 170 instructs the assistant service 300 to prompt the user to recite a unique token 174 prescribed to the user 10. The profile service 170 includes a token generator 172 configured to generate the unique token 174 prescribed to the user 10. In some examples, the token generator 172 generates an arbitrary phrase/string of one or more terms as the unique token 174 for the user 10 to recite. As the token 174 is uniquely generated for the user, it is robust for preventing replay attacks where someone may try to spoof the user by submitting offline copies of recordings of the user s voice. For instance, the token generator 172 may generate the arbitrary phrase "Bumblebee" as the unique token 174 prescribed to the user 10 to recite. As such, the instructions received by the assistant service 300 may cause the assistant service 300 to output a verification message as synthesized speech 22 from the user device 110 that prompts the user to speak each term of the one or more terms of the arbitrary phrase (e.g., Bumblebee) to provide consent for releasing the personal information 200. Additionally, the verification message output from the user device 110 as synthesized speech 22 may further indicate the type of personal information the assistant service is requesting the profile service to release.

In additional examples, the token generator 172 extracts, from the requested personal information 200 stored in the centralized data store 168, one or more personal information fragments 202 for use as the unique token 174 for the user 10 to recite. In the example shown, the requested personal information pertains to payment details and an address so the token generator 172 may extract fragments 202 that include house number from the full address of the user 10. For instance, the user's address may be 139 Stoddard Ave., Atlantic City, New Jersey and the fragments 202 extracted therefrom may include "139" that corresponds to the house number portion of the address. In these examples, the profile service 170 further generates a security statement 175 answered by the personal fragments 202 of the unique token 174, whereby the instructions received by the assistant service 300 may cause the assistant service to output the synthesized speech 22 conveying the security statement 175 from the user device 110 for the user 10 to answer via spoken input to provide consent tor releasing the personal information.

In the example shown, the verification message output front the user device 110 as synthesized speech 22 states "So that I can access your address and payment details, please say 'Bumblebee' and speak your house number". Notably, the unique token 174 corresponding to the arbitrary phrase is explicitly conveyed in the verification message, while the security statement 175 is conveyed in the verification message as a challenge for the user 10 to speak the correct house number as the unique token 174 including the personal information fragments 202. To alleviate the burden from having to manually input the address and payment details in full, the user 10 acknowledges the verification message and provides consent for release of the payment information by speaking the utterance 24 "Bumblebee 1-3-9". The user device 110 captures the spoken utterance 24 and transmits audio data 121 characterizing the spoken utterance 24 to the profile service 170 for verification. Here, the profile service 170 executes an automatic speech recognition (ASR) system/model 176 for processing the received audio data 121 to generate a transcription 178 and executes a verifier 180 to determine whether the transcription 178 of the spoken utterance 24 recites each unique token 174 generated by the token generator 172. Continuing with the example, the verifier 180 is configured to verify the user consent when the transcription 178 recites both the unique token 174 corresponding the arbitrary phrase "Bumblebee" and the unique token 174 corresponding to the fragments 202 associated with the house number "1-3-9" of the user's address. As such, the profile service 170 may release the requested personal information 200 (e.g., the user's address and payment details) when the verifier determines the transcription 178 recites the unique tokens 174.

In some implementations, the profile service 170 processes the received audio data 121 to determine whether the spoken utterance 24 captured by the user device 110 was spoken by the user 10 associated with the requested personal information and only releases the personal information 200 to the assistant service 300 when both the verifier 180 determines the transcription 178 recites she unique tokens 174 and the utterance 24 was spoken by the user 10 and not some other user. In these implementations, the profile service 170 may execute a speaker verification (SV) model 184 configured to receive the audio data 121 as input and generate, as output, an evaluation vector 186 representing voice characteristics of the spoken utterance 24. A scorer 188 may determine a SV confidence score indicating a probability/likelihood of the evaluation vector 186 matching a reference vector 205 for the user 10. The reference vector 205 may be obtained from the user profile 12 associated with the user and stored in the centralized data store 168. The SV model 184 may generate the reference vector 205 for the user 10 during a voice enrollment process where the reference vector 205 represents characteristics of the voice of the user. As such, the profile service 170 may verify the identity of the user 10 as the speaker of the spoken utterance 24 when the SV confidence score satisfies a confidence threshold. Notably, the user device 110 may support multiple enrolled users 10 each having a respective reference vector 205 generated by the SV model 184 during a voice enrollment process for the respective user 10. For instance, multiple family members may use a smart speaker residing in the family's home where each family member can undergo the voice enrollment process with the SV model 184 to generate a respective reference vector 205 for that family member that may be stored in the central data store 168.

The speaker verification model 134 may include a text-independent speaker verification (TI-SV) model 184 for generating text-independent (TI) evaluation vectors 186. Notably, the TI-SV model 184 is beneficial since the unique token(s) 174 the user is reciting in the spoken utterance are not predetermined or known a priori. However, the speaker verification model 184 may include a text-dependent speaker verification (TD-SV) model 184 for generating text-dependent (TD) evaluation vectors 186 representing voice characteristics of a user speaking a unique token 174. In this scenario, the unique token 174 may include a password/passphrase only known to the user and for which a TD reference vector 205 is obtained during a voice enrollment process of the user speaking the predetermined password/passphrase. In some scenarios, the TD-SV model 184 is generated dynamically using past instances of the user speaking a unique token as training data. These past instances could pertain to previous interactions with the given assistant service 300 or other assistant services.

In the example shown, the token generator 172 effectively generates two unique tokens 174 for the user 10 to recite that includes the arbitrary phrase "Bumblebee" and the personal information fragments "139" corresponding to the house number extracted from the user's address. The profile service 70 may only generate one of these unique tokens 174 for the user 10 to recite in order to validate the user's consent or the profile service 170 may generate more than two unique tokens 174 for validation. A level of sensitivity of the personal information 200 requested may impact the type, complexity, and number of unique tokens 174 the user needs to recite in order to verify the user consent. Depending on the level of sensitivity of the personal information requested (e.g., phone number versus credit card details), the profile service 170 may prompt the assistant service 300 to obtain additional verification signals, such as biometric markers including finger/palm print, face/retina ID, etc.

With continued reference to FIG. 1B, when the transcription 178 of the spoken utterance 24 recites (permitting some leeway) the unique tokens and the scorer 188 determines the utterance 24 was spoken by the user (e.g., the identity of the user is verified as the speaker of the utterance), the profile service verifies that the user 10 consents to the release of the requested personal information and thereby releases the requested personal information 200 stored on the centralized data store 168 to the assistants service 300. The profile service 170 may remember that the user 10 consented to the release of the personal information 200 to the assistant service 300 and permit the assistant service to re-access the same personal information when needed in the future without performing the verification process or requiring a weaker challenge to the user for re-access. If the personal information changes (e.g., the user moves to a new address), the user profile 12 stored in the centralized data store 168 may be updated to include the new address.

The ASR system/model 176 and/or SV model 184 may execute on the remote system or on the user device 110. Optionally, the profile service 170 may leverage a speech recognizer 310 (FIG. 3) of the assistant service 300 to generate the transcription 178 of the spoken utterance 24.

When the verification process determines that the transcription 178 does not recite the unique tokens and/or the scorer 188 determines the utterance 24 was not spoken by the user (e.g. the identity of the user cannot be verified as the speaker of the utterance), the profile service 170 may instruct the assistant service 300 to prompt the user 10 to speak the unique token 174 a second time or simply inform the assistant service 300 to obtain the requested personal information in full via manual user input.

Figure 3:
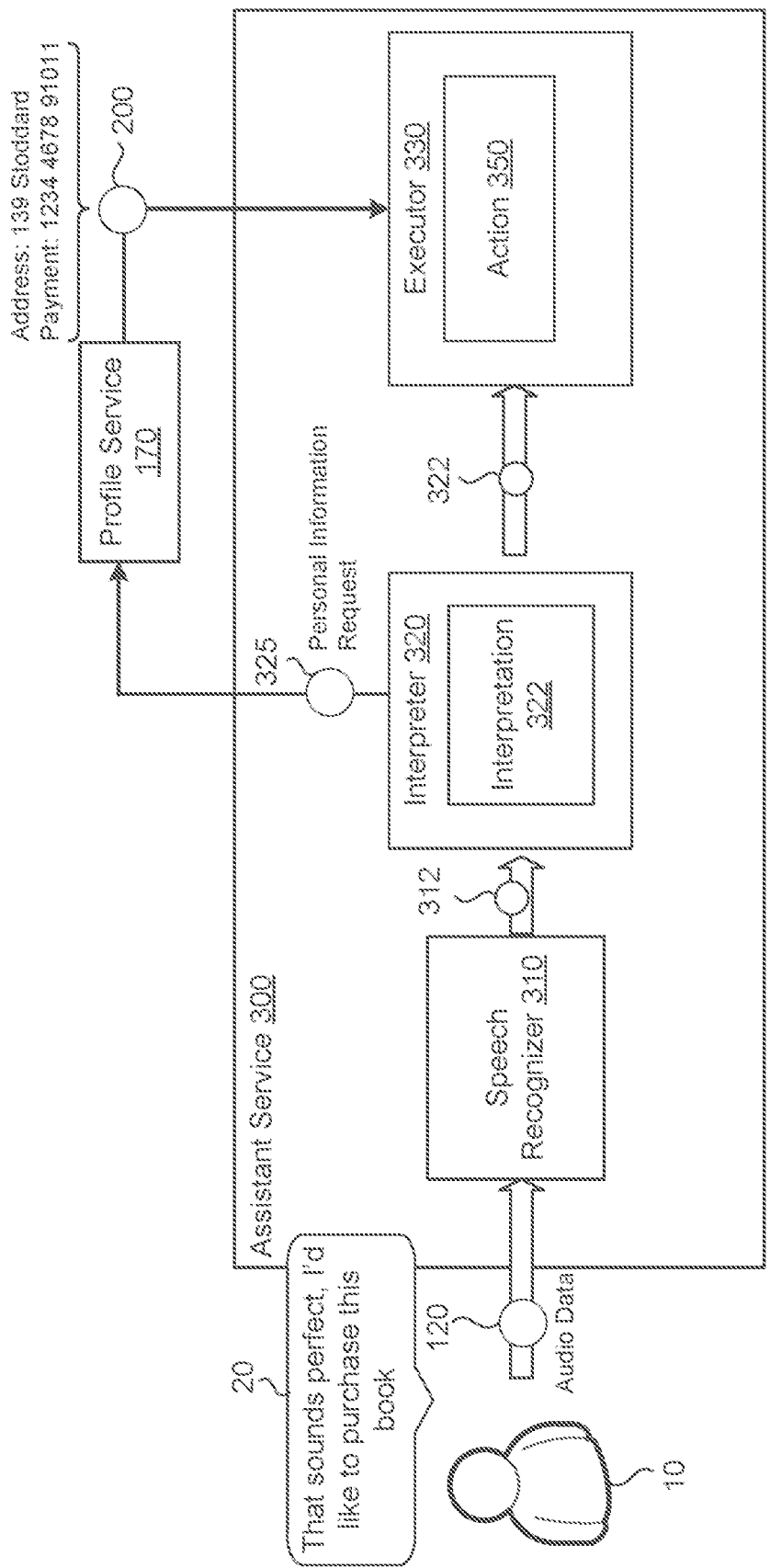

FIG. 3 shows a schematic view of an example assistant service 300 which generally includes a speech recognizer 310, an interpreter 320, and an executor 330. The speech recognizer 310 receives, as input, the audio data 120 characterizing the query 20 spoken by the user 10 that includes "That sounds perfect, I'd like to purchase this book" shown in FIG. 1A and generates, as output, a speech recognition result 312 (e.g., transcription) of the query 20. The speech recognizer 310 may include an end-to-end speech recognition model including a plurality of neural network layers. The speech recognizer 310 may include a conventional speech recognition system having acoustic, pronunciation, and language models.

The interpreter 220 receives the speech recognition result 312 and may perform semantic interpretation (e.g., grammar interpretation) on the speech recognition result 312 to understand a context of the query 20 in order to identify an action 322 to perform in order to fulfil the query. Continuing with the example, the action 322 includes completing a transaction for the purchase of the book *Fundamentals of Meteorology* and shipment of the book to the user's address. Notably, the interpreter 320 learns that the personal information 200 pertaining to the user's payment details and address are needed for performing the action 322. As such, the interpreter 320 may generate the personal information request 325 that requests the profile service 170 to release the personal information 200. Using the techniques described above, the profile service 174 may release the requested personal information 200 pertaining to the payment details and address of the user to the executor 330. The executor 330 may be configured to perform the action 322 by purchasing the book from a merchant using the payment details of the user and brokering the shipment of the book to the user's address.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 5:
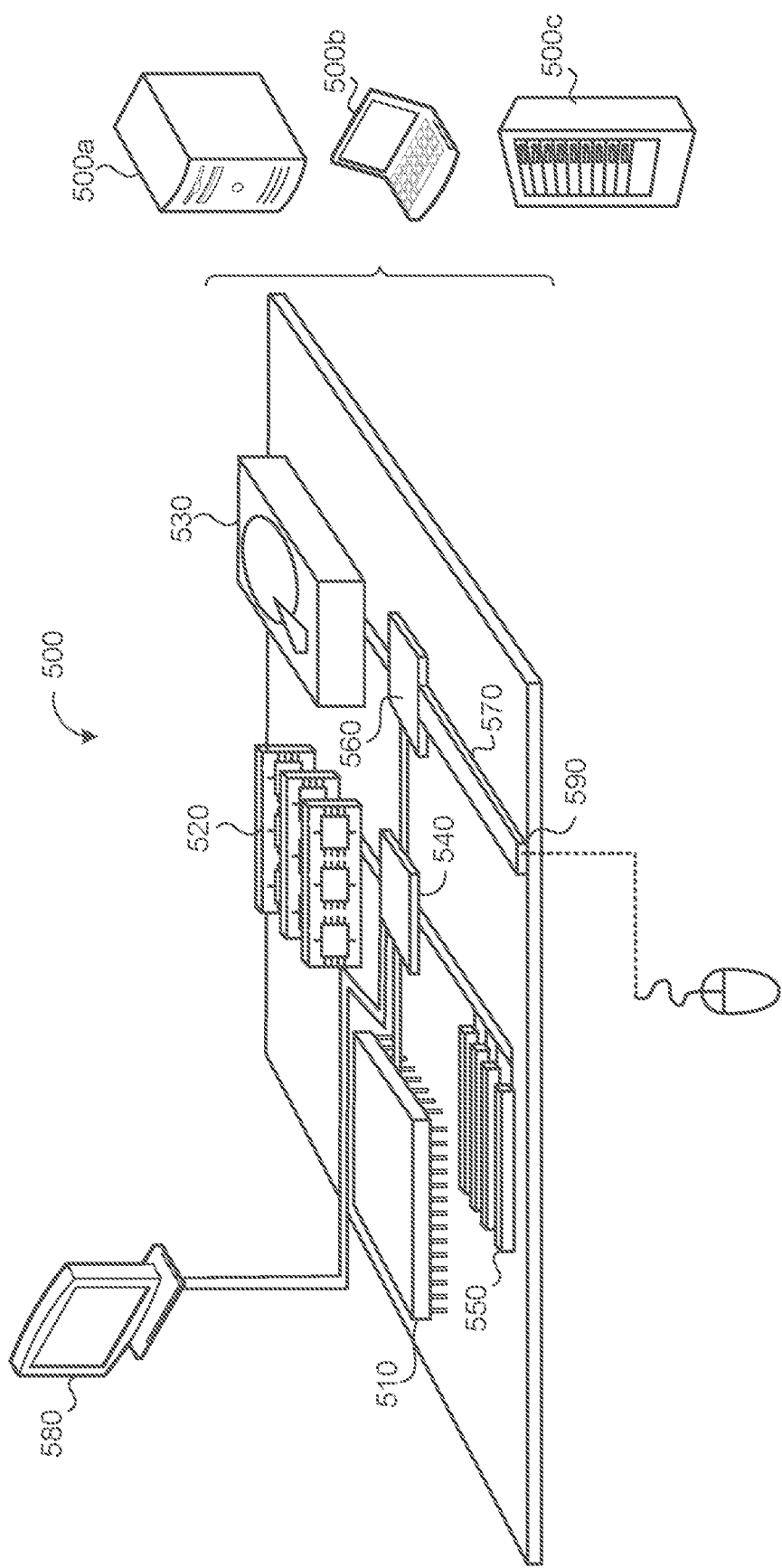
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520,530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions; or data (e.g., program state information; on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g. through a network adapter.

The computing device 500 may be implemented in a number of different forms, as shown in the figure. For example, it may be implemented as a standard server 500*a* or multiple times in a group of such servers 500*a*, as a laptop computer 500*b*, or as part of a rack server system 500*c*.

Figure 6:
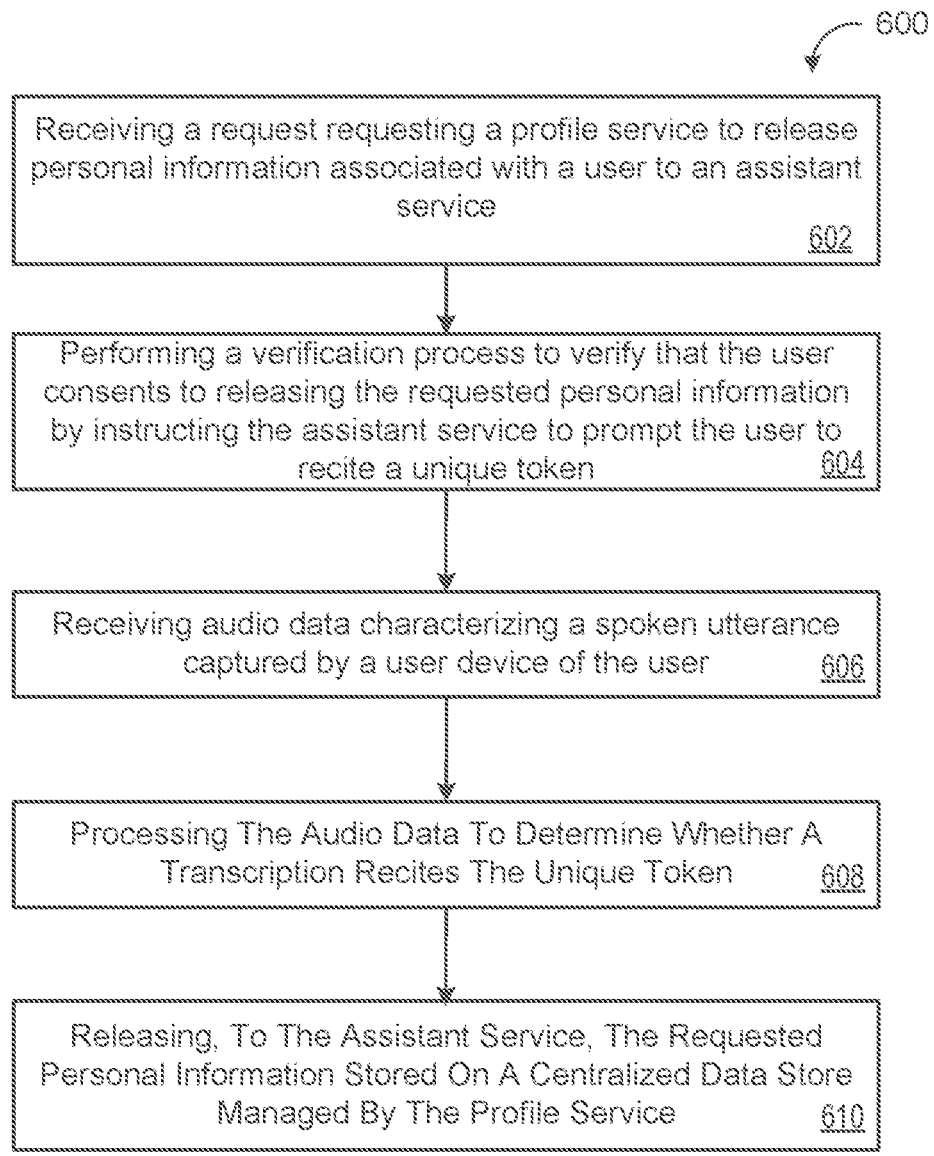
FIG. 6 is a flowchart of an example arrangement of operations for a method of sharing assistant profiles verified via speaker identification.

FIG. 6 is a flowchart of an example arrangement of operations for a method 600 of sharing assistant profiles verified via speaker identification. The method 600 may execute on the data processing hardware 164 of the remote system 160 using instructions stored on the memory hardware 166 of the remote system 160. At operation 602, the method 600 includes receiving, at a profile service 170 executing on the data processing hardware 164, from an assistant service 300 interacting with a user device 110 of a user 10, a request requesting the profile service 170 to release personal information 200 associated with the user 10 to the assistant service 300.

At operation 604, the method 600 includes performing, through the assistant service 300, a verification process to verify that the user 10 consents to releasing the requested personal information 200 to the assistant service 300 by instructing the assistant service 300 to prompt the user 10 174 to recite a unique token 174 prescribed to the user. At operation 606, the method 600 further performs the verification process by receiving audio data 121 characterizing a spoken utterance 24 captured by the user device 110 of the user 10.

At operation 608, the method 600 further performs the verification process by processing the audio data 121 to determine whether a transcription 176 of the spoken utterance 24 recites the unique token 174. At operation 610, the method 600 further performs the verification process by releasing, to the assistant service 300, the requested personal information 200 stored on a centralized data store 168 managed by the profile service 170 when the transcription 176 of the spoken utterance 24 recites the unique token 174.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory. Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks, magneto optical disks, and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input, in addition, a computer can interact with a user by sending documents to and receiving documents from a device that is used by the user; for example, by sending web pages to a web browser on a users client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware causes the data processing hardware to perform operations comprising:
receiving, at a profile service executing on the data processing hardware, from an assistant service executing on a user device of a user, a request requesting the profile service to release personal information associated with the user to the assistant service, wherein the assistant service sends the request to the profile service in response to the assistant service:
receiving initial audio data characterizing a query spoken by the user that requests the assistant service to perform an action on behalf of the user; and
processing the initial audio data to identify the personal information associated with the user as personal information explicitly stored by the user on a centralized data store managed by the profile service that the assistant service requires in order to perform the action on the behalf of the user;
determining that the user device is not suitable for receiving out-of-band notifications directly from the profile service without the assistant service for gaining user consent for releasing the requested personal information to the assistant service; and based on determining that the user device is not suitable for receiving the out-of-band notifications directly from the profile service, performing, through the assistant service, a verification process to verify that the user consents to releasing the requested personal information to the assistant service by:

extracting, from the requested personal information explicitly stored by the user on the centralized data store that the assistant service requires in order to perform the action on the behalf of the user, one or more personal information fragments, the extracted one or more personal information fragments comprising a unique token prescribed to the user by the profile service;

generating a security statement answered by the extracted one or more personal information fragments that comprise the unique token;

generating a verification message that prompts the user to provide a spoken input that answers the security statement;

instructing the assistant service to output the verification message from the user device;

receiving audio data characterizing a spoken utterance captured by the user device of the user;

processing the audio data to determine whether a transcription of the spoken utterance recites each of the one or more extracted personal information fragments; and when the transcription of the spoken utterance recites each of the one or more extracted personal information fragments, releasing, to the assistant service, the requested personal information stored on the centralized data store managed by the profile service, the requested personal information enabling the assistant service to perform the action on behalf of the user.

2. The computer-implemented method of claim 1, wherein the operations further comprise, while performing the verification process through the assistant service:

processing the audio data to determine whether the spoken utterance captured by the user device was spoken by the user associated with the requested personal information, wherein releasing the requested personal information to the assistant service further comprises releasing the requested personal information to the assistant service when the transcription of the spoken utterance recites each of the one or more extracted personal information fragments and the utterance was spoken by the user.

3. The computer-implemented method of claim 1, wherein, after releasing the requested personal information to the assistant service, the assistant service is configured to use the personal information to perform the action on the behalf of the user.

4. The computer-implemented method of claim 1, wherein the assistant service executes on the user device and a server remote from the user device in parallel.

5. The computer-implemented method of claim 1, wherein the operations further comprise, in response to receiving the request for the personal information associated with the user:

determining whether the requested personal information is stored in the centralized data store;

determining whether a set of user permissions associated with the user restrict the assistant service from accessing the requested personal information; and when at least one of the requested personal information is not stored in the centralized data store or the set of user permissions associated with the user restrict the assistant service from accessing the requested personal information:

bypassing performance of the verification process; and informing the assistant service that the user is required to provide the requested personal information in full to the assistant service.

6. The computer-implemented method of claim 5, wherein the operations further comprise, after informing the assistant service that the user is required to provide the requested personal information in full:

receiving, from the assistant service, a profile storage request requesting the profile service to store the requested personal information provided by the user to the assistant service, the profile storage request comprising the requested personal information provided in full by the user; and storing the requested personal information provided by the user in the centralized data store.

7. The computer-implemented method of claim 1, wherein the user device is suitable for receiving out-of-band notifications when the user device comprises a display screen.

8. The computer-implemented method of claim 1, wherein determining the user device is not suitable for receiving the out-of-band notifications is based on application settings associated with the assistant service indicating whether the profile service is restricted from communicating the out-of-band notifications directly to the user device for gaining user consent for releasing the personal information.

9. The computer-implemented method of claim 1, wherein performing the verification process through the assistant service further comprises:

determining a level of sensitivity of the requested personal information; and based on the level of sensitivity of the requested personal information, generating an arbitrary phrase of one or more terms, the generated arbitrary phrase comprising the unique token, wherein:

generating the verification message that prompts the user to provide the spoken input that answers the security statement comprises generating the verification message that prompts the user to provide the spoken input that recites the unique token and that answers the security statement;

processing the audio data to determine whether the transcription of the spoken utterance recites each of the one or more extracted personal information fragments further comprises processing the audio data to determine whether the transcription of the spoken utterance recites each term of the one or more terms of the arbitrary phrase; and releasing the personal information stored on the centralized data store managed by the profile service when the transcription of the utterance recites each term of the one or more terms of the arbitrary phrase and each of the one or more extracted personal information fragments.

10. The computer-implemented method of claim 9, wherein the verification message output from the user device further indicates a type of the personal information the assistant service is requesting the profile service to release.

12. The computer-implemented method of claim 1, wherein the personal information comprises demographic information associated with the user that includes at least one of:
   an address;
   a phone number;
   payment information;
   a date of birth;
   social security number;
   gender;
   contact information;
   marital status; or
   occupation.

12. The computer-implemented method of claim 1, wherein the personal information comprises one or more user preferences comprising at least one of:
   scheduling preferences;
   communication preferences;
   shipping preferences;
   music/movie genre(s);
   dietary preferences/restrictions;
   purchase history;
   contacts; or
   password(s).

13. A system comprising:
   data processing hardware; and
   memory hardware in communication with the data processing hardware, the memory hardware storing instructions that when executed on the data processing hardware cause the data processing hardware to perform operations comprising,
      receiving, at a profile service executing on the data processing hardware, from an assistant service executing on a user device of a user, a request requesting the profile service to release personal information associated with the user to the assistant service, wherein the assistant service sends the request to the profile service in response to the assistant service:
         receiving initial audio data characterizing a query spoken by the user that requests the assistant service to perform an action on behalf of the user; and
         processing the initial audio data to identify the personal information associated with the user as personal information explicitly stored by the user on a centralized data store managed by the profile service that the assistant service requires in order to perform the action on the behalf of the user;
      determining that the user device is not suitable for receiving out-of-band notifications directly from the profile service without the assistant service for gaining user consent for releasing the requested personal information to the assistant service; and
      based on determining that the user device is not suitable for receiving the out-of-band notifications directly from the profile service, performing, through the assistant service, a verification process to verify that the user consents to releasing the requested personal information to the assistant service by:
         extracting, from the requested personal information explicitly stored by the user on the centralized data store that the assistant service requires in order to perform the action on the behalf of the user, one or more personal information fragments, the extracted one or more personal information fragments comprising a unique token prescribed to the user by the profile service;
         generating a security statement answered by the extracted one or more personal information fragments that comprise the unique token;
         generating a verification message that prompts the user to provide a spoken input that answers the security statement;
         instructing the assistant service to output the verification message from the user device;
         receiving audio data characterizing a spoken utterance captured by the user device of the user;
         processing the audio data to determine whether a transcription of the spoken utterance recites each of the one or more extracted personal information fragments; and
         when the transcription of the spoken utterance recites each of the one or more extracted personal information fragments, releasing, to the assistant service, the requested personal information stored on the centralized data store managed by the profile service, the requested personal information enabling the assistant service to perform the action on behalf of the user.

14. The system of claim 13, wherein the operations further comprise, while performing the verification process through the assistant service:
   processing the audio data to determine whether the spoken utterance captured by the user device was spoken by the user associated with the requested personal information,
   wherein releasing the requested personal information to the assistant service further comprises releasing the requested personal information to the assistant service when the transcription of the spoken utterance recites each of the one or more extracted personal information fragments and the utterance was spoken by the user.

15. The system of claim 13, wherein, after releasing the requested personal information to the assistant service, the assistant service is configured to use the personal information to perform the action on the behalf of the user.

16. The system of claim 13, wherein the assistant service executes on the user device and a server remote from the user device in parallel.

17. The system of claim 13, wherein the operations further comprise, in response to receiving the request for the personal information associated with the user:
   determining whether the requested personal information is stored in the centralized data store;
   determining whether a set of user permissions associated with the user restrict the assistant service from accessing the requested personal information; and
   when at least one of the requested personal information is not stored in the centralized data store or the set of user permissions associated with the user restrict the assistant service from accessing the requested personal information:
      bypassing performance of the verification process; and
      informing the assistant service that the user is required to provide the requested personal information in full to the assistant service.

18. The system of claim 17, wherein the operations further comprise, after informing the assistant service that the user is required to provide the requested personal information in full:

receiving, from the assistant service, a profile storage request requesting the profile service to store the requested personal information provided by the user to the assistant service, the profile storage request comprising the requested personal information provided in full by the user; and storing the requested personal information provided by the user in the centralized data store.

19. The system of claim 13, wherein the user device is suitable for receiving out-of-band notifications when the user device comprises a display screen.

20. The system of claim 13, wherein determining the user device is not suitable for receiving the out-of-band notifications is based on application settings associated with the assistant service indicating the profile service is restricted from communicating the out-of-band notifications directly to the user device for gaining user consent for releasing the personal information.

21. The system of claim 13, wherein performing the verification process through the assistant service further comprises:
- determining a level of sensitivity of the requested personal information; and
- based on the level of sensitivity of the requested personal information, generating an arbitrary phrase of one or more terms, the generated arbitrary phrase comprising the unique token, wherein:
- generating the verification message that prompts the user to provide the spoken input that answers the security statement comprises generating the verification message that prompts the user to provide the spoken input that recites the unique token and that answers the security statement;
- processing the audio data to determine whether the transcription of the spoken utterance recites each of the one or more extracted personal information fragments further comprises processing the audio data to determine whether the transcription of the spoken utterance recites each term of the one or more terms of the arbitrary phrase; and
- releasing the personal information stored on the centralized data store managed by the profile service when the transcription of the utterance recites each term of the one or more terms of the arbitrary phrase and each of the one or more extracted personal information fragments.

22. The system of claim 21, wherein the verification message output from the user device further indicates a type of the personal information the assistant service is requesting the profile service to release.

23. The system of claim 13, wherein the personal information comprises demographic information associated with the user that includes at least one of:
- an address;
- a phone number;
- payment information;
- a date of birth;
- social security number;
- gender;
- contact information;
- marital status; or
- occupation.

24. The system of claim 13, wherein the personal information comprises one or more user preferences comprising at least one of:
- scheduling preferences;
- communication preferences;
- shipping preferences;
- music/movie genre(s);
- dietary preferences/restrictions;
- purchase history;
- contacts; or
- password(s).

* * * * *